Dec. 17, 1957   F. G. ELDRIDGE   2,816,727
CABLE SUPPORT
Filed April 21, 1954   2 Sheets-Sheet 1

INVENTOR.
Frank G. Eldridge
BY Darby & Darby
HIS ATTORNEYS,

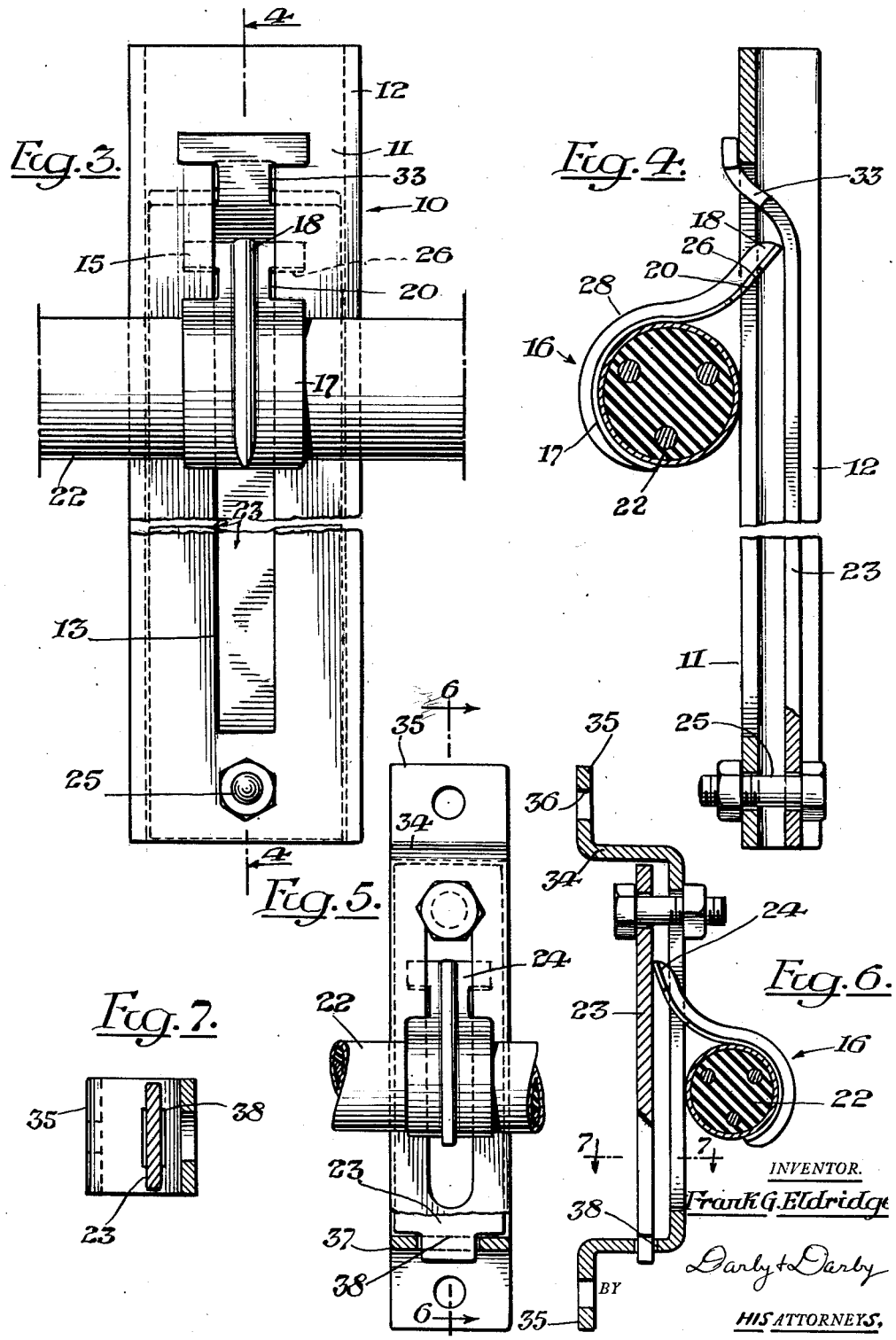

United States Patent Office 2,816,727
Patented Dec. 17, 1957

2,816,727
CABLE SUPPORT

Frank G. Eldridge, Glen Rock, N. J., assignor to Frank G. Eldridge Co., New York, N. Y., a partnership comprising Frank G. Eldridge and Julien E. Fouchaux Application April 21, 1954, Serial No. 424,552

6 Claims. (Cl. 248—70)

The present invention relates to means for spacing, supporting and retaining cables, pipes, rods and the like in fixed position.

More particularly still the invention relates to such cable supporting means which are adapted to support a plurality of cables of the same or different sizes in fixed position and in which clamping elements may be readily inserted in a support to hold cables or the like firmly in place, the clamping elements being fixed in the supporting member by a single simple operation.

It is an object of the invention to provide clamping means for fastening in position on a supporting member one or a number of cables, pipes or the like, spaced as desired.

It is another object of the invention to provide such clamping means which will clamp a number of cables or the like to the support even though the various cables differ in size.

It is a further object of the invention to provide such clamping means which are readily inserted in the supporting means and retained in their clamping position by means of a single simple locking device.

It is another object of the invention to provide such cable supporting and clamping means which is readily and economically manufactured.

Other objects and features of the invention will be apparent when the following description is considered in connection with the annexed drawings, in which, Figure 1 is a plan view of one embodiment of my cable supporting and clamping device;

Figure 3 is a plan view of a modified form of the cable supporting and clamping device of my invention;

Figure 4 is a cross-sectional view of the device of Figure 3, the section being taken on the plane of the line 4—4 of Figure 3;

Figure 5 is a plan view of a second modified form of the cable supporting and clamping device of my invention;

Figure 6 is a cross-sectional view of the device of Figure 5 the view being taken on the plane of the line 6—6 of Figure 5; and Figure 7 is a transverse cross-sectional view of the device of Figures 5 and 6, the view being taken on the plane of the line 7—7 of Figure 6.

Figure 1:
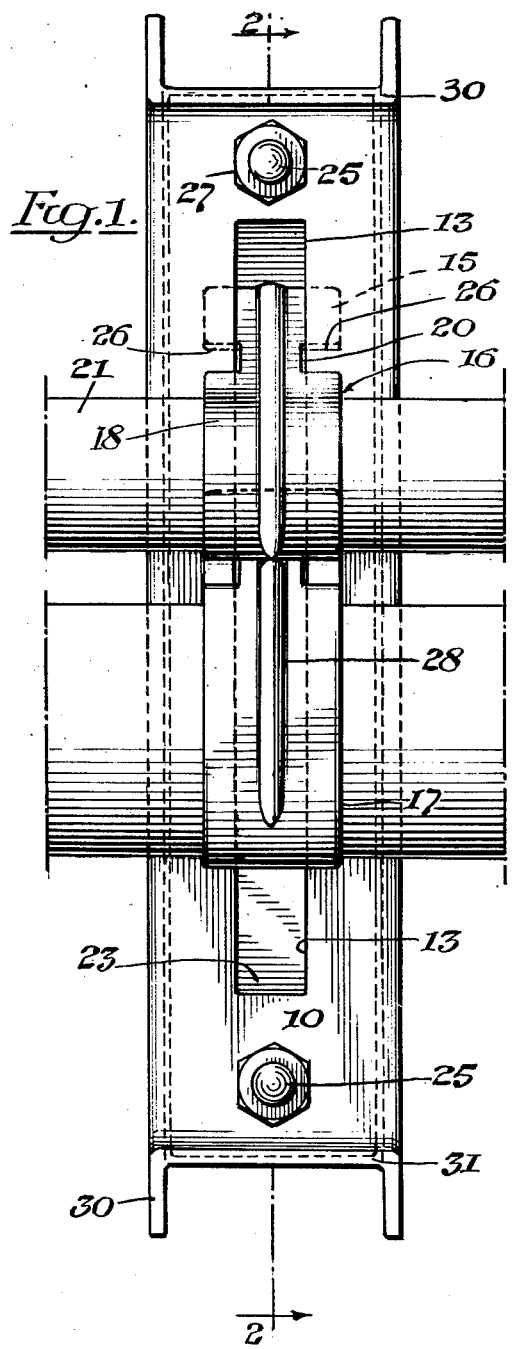
Figure 2:
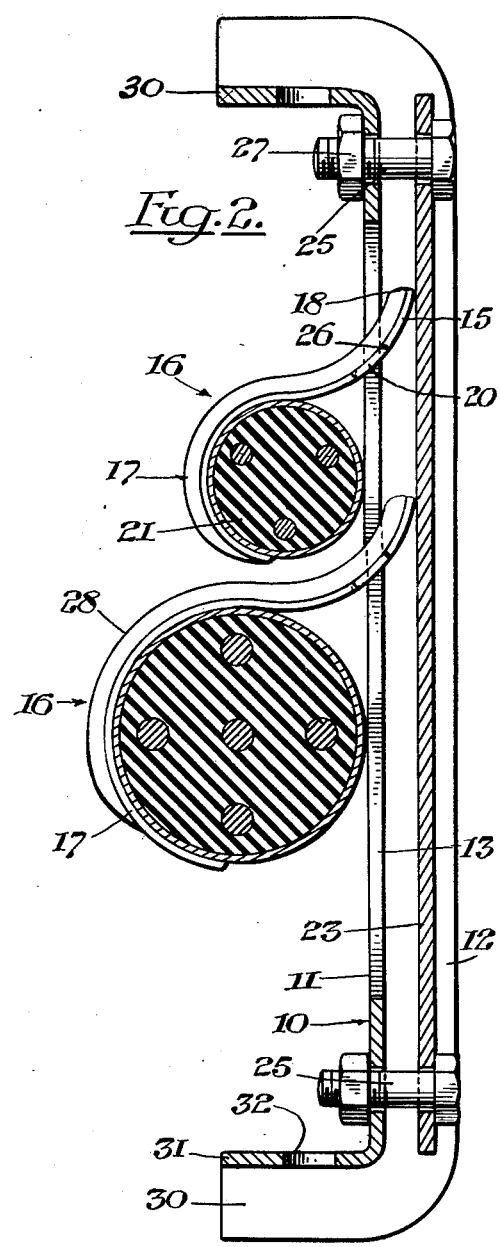
Figure 2 is a cross-sectional view of the device of Figure 1, the view being taken on the plane of the line 2—2 of Figure 1.

Referring now to the drawings and particularly to Figures 1 and 2, there is shown at 10 a supporting member which is in the shape of a channel having the base 11 and the flanges 12. A longitudinal slot 13 is provided in the channel base, this slot being adapted to receive the T-shaped head 15 of a cable clamp 16. The cable clamps generally designated 16 are provided with a portion 17 which is arcuate in form and with a stem or tail 18 which is curved in the direction opposite to the curvature of the part 17, the tail 18 is provided with the slots 20 which form the T-shaped head 15 previously mentioned. Thus the T-shaped head 15 of a clamp 16 may be inserted through the slot 13 and rotated through a quarter of a turn placing the body of the clamp on one side of the base 11 and the T-shaped head on the opposite side, and a cable such as that shown at 21 or 22 inserted beneath the arcuately curved portion 17 of the clamp. When thus positioned a locking bar 23 may be caused to bear against the ends 18 of all of the clamps 16, this bar being inserted between the flanges 12 of the channel 10 and held in position by means of screws 25 passing through the locking bar 23 and through the base 11 of the channel 10. When the locking bar is thus positioned as particularly shown in Figure 2, the clamps 16 fulcrum about the edges 26 of the slots 20 rotating, as seen in Figure 2, in a counterclockwise direction and clamping the cables 21 or 22 against the outer surface of the channel base 11.

The locking bar 23 is held in position as stated by means of the screws 25 which screws may be threaded into openings in the channel base or may, as shown, be provided with nuts 27. In the preferred form of the clamps 16 they are provided with a central reenforcing rib 28 which makes the clamps more rigid and prevents them from bending as they are locked into position by the bar 23.

The channel 10 may be provided with bent-up ends as shown at 30, the base portion 31 of these bent-up ends having apertures 32 therein through which the channel member may be fastened to a suitable surface. In some instances these bent-up ends 30 may be omitted and the screws 25 serve both to fasten the locking bar 23 in position within the channel and at the same time fasten the channel to a secondary support.

Referring now to Figures 3 and 4 there is shown therein a modification of the cable supporting means of my invention, the modification being one of the locking bar only the remainder of the structure being substantially identical to that described in Figures 1 and 2 and the parts therefore being identified by the same reference characters. In these figures the locking bar 23 is provided with a bend 33 at one end thereof, the ends of the locking bar lying in planes parallel to each other, the end 33 being, however, offset from the remainder so that it can be inserted through the slot 13 and rest upon the face of the base 11 of the channel member 10. With this arrangement only one screw or bolt 25 need be utilized, this bolt passing through aligned holes in locking bar 23 and channel base 11. As before, the movement of the locking bar 23 into the position shown will cause all of the cable clamps 16, the heads of which have been inserted through the slot 13 and turned to lie crosswise of that slot, to fulcrum about the edges 26 of the notches 20 thereby clamping cables such as 22 in position against the face of the channel 10.

The channel 10 of Figures 3 and 4 may be provided with bent-up ends such as those shown at 30 in Figures 1 and 2 or may terminate as shown in Figures 3 and 4 and be fastened to a support in any suitable manner for example by utilizing the screw 25 to fasten the unit to a wall or similar supporting member.

A second modification of my invention is shown in Figures 5 through 7. In this form of the invention a strap 34 is substituted for the channel 10, the strap being bent into a U-shaped form and having extensions 35 lying parallel to the plane of the front surface of the U by means of which extensions the strap may be fastened to a supporting surface. In order to facilitate such fastening the extensions 35 are provided with bores 36 through which screws, not shown, may be inserted. The extensions 35 may be omitted and the strap 34 U-shaped as described be welded or brazed to a wall or other suitable support. In this form of the invention which, aside from the substitution of the strap for the channel members, is essentially the same as that of the foregoing forms, the locking bar is slightly modified being provided at one end with a narrow tongue 37 adapted to enter a slot 38 in one arm of the U-shaped strap 34, the locking bar proper being of substantially the same width as the strap 34. At its opposite end the locking bar 23 is provided with an aperture which, when the bar is in the position shown in Figure 6, is in alignment with the end of the slot 13 in the strap 34. Thus a bolt extending through the locking bar 23 and the slot 13 holds the locking bar in position against the tails 18 of the clamps 16 and causes the arcuate portion 17 of the clamps 16 to bear against the outer portion of the cable such as that indicated at 22. In this instance, as in the prior instances, the clamps 16 fulcrum about the edges 26 of the notches 20 and cause the clamping action heretofore referred to.

In all of the forms described the clamps 16 are readily placed in position on the supporting member 11 or 34 by simply inserting the T-shaped heads 15 of the clamps through the slot 13 and then rotating the clamps through a quarter of a turn so that the T-shaped head 15 lies on one side of the member 11 or 34 as the case may be and the body of the clamp lies on the opposite side. This places the edges 26 of the notches 20 against the inner surface of the supporting member 11 or 34 and causes the clamps to fulcrum about their edges 26 when the locking bar 13 is caused to bear against the end portions of the tails 18.

In all of the forms of the invention described it will be obvious that the cables supported on the support may be spaced thereacross in a desired manner since the location of any one clamp is not dependent upon the location of any other clamp, whereas in many older systems of cable support each clamp was necessarily spaced adjacent to a preceding clamp, and the cables thus were necessarily crowded closely adjacent to one another.

While I have described preferred embodiments of my invention it will be understood that many other modifications may be made without departing from the spirit and scope of my invention. I wish therefore to be limited not by the foregoing description but, on the contrary, solely by the claims granted to me.

What is claimed is:

1. A cable supporting and clamping means comprising, in combination, a base member having a longitudinally elongated slot therein, a clamp member having an arcuate body portion adapted to engage a cable along a portion of its circumference and a T-shaped end engaging the side of said base member opposite said clamp body portion, said clamp extending through said slot, and means comprising a bar extending longitudinally of said base member on the side thereof opposite said clamp body portion, said bar being movable toward said base member to engage said T-shaped end to press said end toward said base member to cause rotation of said clamp about a fulcrum, said fulcrum comprising the inner edges of said T-shaped end to thereby firmly clamp a cable to said base member.

2. A device as claimed in claim 1, characterized in that said bar is fixed in position relative to said base member by means of screws passing through aligned openings in said bar and said base member.

3. A device as claimed in claim 1, characterized in that said base member is in the form of a channel and further characterized in that said bar lies within said channel flanges.

4. A device as claimed in claim 1, characterized in that said bar has a bent-over end, said end extending through said slot to the face of said base member and means for fixing the opposite end of said bar in position relative to the base of said channel.

5. A device as claimed in claim 1, characterized in that said base member comprises a strap bent into U form, said strap having an aperture in one of the arms of said U and further characterized in that said bar has a shoulder at one end thereof, said shouldered end being inserted in said aperture and the opposite end of said bar being fixed to said strap by a screw passing through aligned openings in said strap and said bar.

6. A cable supporting and clamping means comprising, in combination, a channel member having a longitudinal elongated slot in the base portion thereof, a clamp member having an arcuate body portion adapted to engage a cable along a portion of its circumference and an elongated end curved in a direction opposite to said body portion, said end having a pair of inwardly transversely extending notches adjacent the end thereof, forming a T-shaped head, said clamp passing through said slot, said T-shaped head engaging the underside of said channel at opposite sides of said slot and the edges of said longitudinal slot lying in said notches, and a locking bar inserted within the flanges of said channel and bearing against the T-shaped head of said clamp to cause said clamp to rotate about the points of engagement of said T-shaped heads with said channel base to rotate said clamp to cause said body portion to bear against said cable and hold it firmly against the outer side of said channel base.

References Cited in the file of this patent

UNITED STATES PATENTS

| | | |
|---|---|---|
| 931,399 | Dusinberre | Aug. 17, 1909 |
| 2,219,545 | Gordon | Oct. 29, 1940 |
| 2,514,615 | Aber | July 11, 1950 |
| 2,558,328 | Winslow | June 26, 1951 |
| 2,586,001 | Carpenter | Feb. 19, 1952 |
| 2,653,784 | Wasselle | Sept. 29, 1953 |

FOREIGN PATENTS

| | | |
|---|---|---|
| 685,212 | Germany | of 1939 |